United States Patent
Bushida et al.

(10) Patent No.: US 6,813,287 B2
(45) Date of Patent: Nov. 2, 2004

(54) WAVELENGTH CONTROL DEVICE FOR LASER DEVICE

(75) Inventors: Satoru Bushida, Oyama (JP); Hiroshi Tanaka, Moka (JP); Motoharu Nakane, Oyama (JP)

(73) Assignee: Gigaphoton Inc., Tokyo (JP)

( * ) Notice: Subject to any disclaimer, the term of this patent is extended or adjusted under 35 U.S.C. 154(b) by 82 days.

(21) Appl. No.: 09/819,745

(22) Filed: Mar. 29, 2001

(65) Prior Publication Data

US 2002/0141464 A1 Oct. 3, 2002

(51) Int. Cl.$^7$ .............................. H01S 3/10; H01S 3/13; H01S 3/08
(52) U.S. Cl. .............................. 372/20; 372/32; 372/99; 372/102; 372/107
(58) Field of Search .............................. 372/20, 32, 57, 372/99, 102, 107

(56) References Cited

U.S. PATENT DOCUMENTS 5,438,416 A  8/1995 Nater .......................... 356/373

6,192,064 B1 * 2/2001 Algots et al. .................. 372/99

* cited by examiner

Primary Examiner—Don Wong
Assistant Examiner—James Menefee
(74) Attorney, Agent, or Firm—Westerman, Hattori Daniels & Adrian, LLP

(57) ABSTRACT

A wavelength control device for a laser device capable of controlling a center wavelength of a laser light to be a predetermined target wavelength is provided. For this purpose, the wavelength control device for the laser device includes a movable holder (36) for making an optical component (34) movable with respect to a laser optical axis (20), and a laser controller (13) for moving the optical component with respect to the laser optical axis and changing an incident angle ($\phi$) of a laser light (21) on a band narrowing optical component (33) to thereby control a center wavelength of the laser light to be a predetermined target wavelength, and the movable holder comprises a piezoelectric element unit (41) moving by a very short distance and a pulse motor unit (40) moving by a longer distance than the piezoelectric element unit.

12 Claims, 10 Drawing Sheets

WAVELENGTH CONTROL DEVICE FOR LASER DEVICE

TECHNICAL FIELD

The present invention relates to a wavelength control device for controlling a center wavelength by band narrowing of a laser light.

BACKGROUND ART

A band narrowing art for narrowing a band of a laser light oscillated from an excimer laser device and the like and controlling its center wavelength to be a desired value is conventionally known, and it is shown, for example, in Japanese Patent Application Laid-open No. 5-283785. FIG. 10 shows a configuration of a laser device disclosed in Japanese Patent Application Laid-open No. 5-283785, and the prior art will be explained hereinafter based on FIG. 10.

In FIG. 10, an excimer laser device 11 includes a laser chamber 12 for containing a laser gas being a laser medium, with windows 17 and 19 for transmitting a laser light 21 being attached at both end portions thereof. Inside the laser chamber 12, high voltage is applied between discharge electrodes not shown to excite the laser gas by electric discharge and to thereby generate the laser light 21.

The generated laser light 21 enters a band narrowing unit 30, expanded by a prism 32, reflected by a wavelength selection mirror 34, and is incident on a grating 33 being a band narrowing optical component. At the grating 33, only the laser light 21 having a wavelength close to a predetermined center wavelength $\lambda c$ is reflected by diffraction. This is called band narrowing.

In this situation, the wavelength selection mirror 34 is mounted on a movable holder 36 the angle of which with respect to the laser light 21 is changeable by a pulse motor 40. Changing the orientation of the wavelength selection mirror 34 changes an incident angle of the laser light 21 with respect to the grating 33, which changes the center wavelength $\lambda c$ of the laser light 21 diffracted by the grating 33. Specifically, by changing the orientation of the wavelength selection mirror 34, the center wavelength $\lambda c$ of the laser light 21 oscillated can be controlled to be a desired target wavelength $\lambda 0$.

Further, the excimer laser device 11 takes out part of the laser light 21 by means of a beam splitter 22, and monitors the center wavelength $\lambda c$ of the laser light 21 by means of a wavelength monitor 37. A laser controller 13 outputs a command signal to the pulse motor 40 based on the monitored center wavelength $\lambda c$ to rotate the wavelength selection mirror 34, thereby controlling the center wavelength $\lambda c$ of the laser light 21 to be the desired target wavelength $\lambda 0$.

The laser light 21 the band of which is narrowed inside the band narrowing unit 30 is amplified inside the laser chamber 12 while reciprocating several times between the band narrowing unit 30 and the front mirror 16 for partly reflecting the laser light 21. Subsequently, it is radiated toward the front (leftward in FIG. 10) as the laser light 21 having the center wavelength $\lambda c$.

However, the aforementioned prior art has the following disadvantages.

Specifically, when the excimer laser device 11 is used as a light source for exposure of a processing machine such as a stepper, it is sometimes necessary to suspend the discharge and stop laser oscillation for a fixed period of time for replacement of a wafer and reticle. In such a case, a property of an optical component itself such as the prism 32 changes, or fixture components (not shown) for fixing the optical components is extended or contracted due to reduction in temperature around the optical components, thus causing the center wavelength $\lambda c$ to deviate. Further, after the discharge is stopped for a while, a drift of the center wavelength $\lambda c$ occurs due to a change in a state of the discharge electrodes and the laser gas. This drift is called chirping. Furthermore, the processing machine (not shown) sometimes sends a command to change the target wavelength $\lambda 0$ in response to a change in the temperature, atmospheric pressure and the like of the surrounding atmosphere.

When the center wavelength $\lambda c$ has to be changed as described above, the laser controller 13 outputs a command signal to the pulse motor 40 and thereby changes the angle of the wavelength selection mirror 34 to change the center wavelength $\lambda c$. However, response time of the pulse motor 40 is generally long, and it takes about a few and a few tens of m sec to reach a desired stroke length of the pulse motor 40 after receiving a command signal. Thus, by the time the center wavelength $\lambda c$ reaches the target wavelength $\lambda 0$ after the laser controller 13 issues a command, a few pulses or a few tens of pulses of the laser light 21 are radiated if the laser light 21 is oscillated at a high pulse frequency of, for example, a few kHz.

As the result, the laser light 21 with the center wavelength $\lambda c$ unsuitable for exposure is incident on the processing machine, and defective exposure occurs. In order to avoid the above, the laser light 21 has to be blocked by, for example, a shutter or the like, but due to the time required to open and close the shutter, waiting time until the processing starts becomes longer, thus causing the disadvantage of reducing the availability of the processing machine.

SUMMARY OF THE INVENTION

The present invention is made to eliminate the disadvantages of the above art, and its object is to provide a wavelength control device for a laser device capable of controlling a center wavelength of a laser light to be a target wavelength in a short time.

In order to attain the above-described object, the wavelength control device for a laser device according to the present invention is a wavelength control device for a laser device including a movable holder for making an optical component movable with respect to a laser optical axis, and a laser controller for moving the optical component with respect to the laser optical axis and changing an incident angle of laser light on a band narrowing optical component to thereby control a center wavelength of the laser light to be a target wavelength, and is characterized in that the movable holder comprises a first drive mechanism moving by a very short distance and a second drive mechanism moving by longer distance than the first drive mechanism.

According to the above configuration, when the center wavelength is finely controlled, the movable holder is driven by the first drive mechanism capable of moving by a very small distance, and when the center wavelength is moved to a large extent, it is driven by the second drive mechanism. Consequently, a wavelength control with high precision over a wide range is made possible.

Further, in the wavelength control device for the laser device, the first drive mechanism may comprise a piezoelectric element unit, and the second drive mechanism may comprise a pulse motor unit.

According to the above configuration, the piezoelectric element unit quick in response and the pulse motor unit with a long stroke are included. When the center wavelength has to be controlled in a short time, it is controlled with the piezoelectric element unit, and when it has to be controlled to a large extent, it is controlled with the pulse motor unit, thus making it possible to control the wavelength quickly over a wide range.

Further, in the wavelength control device for the laser device, on moving the optical component, the laser controller may move the optical component by means of the piezoelectric element unit, and thereafter, may move the optical component by means of the pulse motor unit.

According to the above configuration, since the optical component is initially moved by the piezoelectric element unit quick in response, the center wavelength quickly reaches the target wavelength. Thereafter, the control is performed by means of the pulse motor unit with a long stroke, and therefore the center wavelength can be changed to a large extent when the target wavelength is changed, thus facilitating response.

Further, in the wavelength control device for the laser device, the laser controller may move the optical component by means of the piezoelectric element unit to set the center wavelength at the predetermined target wavelength, and may compensate a change of a position of the optical component caused by returning the piezoelectric element unit to a neutral position by means of the pulse motor unit, in a state in which the center wavelength being set at the target wavelength, at the same time when returning the piezoelectric element unit to the neutral position.

The piezoelectric element unit is sometimes deteriorated if a fixed high voltage keeps applied thereto for a long period of time. Accordingly, by returning the piezoelectric element to the neutral position, applied voltage does not become so high, thus preventing deterioration. When the piezoelectric element is returned to the neutral position, the positional change of the optical component is compensated by the pulse motor unit, thereby making it possible to always set the center wavelength at the target wavelength.

Further, in the wavelength control device for the laser device, a wavelength monitor for monitoring the center wavelength of the laser light is further included, and on resuming laser oscillation after stopping the laser oscillation for more than a predetermined period of time, the laser controller may drive the pulse motor unit and thereby changes a position of the optical component with respect to the laser optical axis previously while the oscillation is stopped, based on the target wavelength after resuming the oscillation, and may drive the movable holder by means of the piezoelectric element unit and thereby changes the position of the optical component with respect to the laser optical axis again, immediately after resuming the oscillation, based on the center wavelength of the laser light monitored by the wavelength monitor.

When the laser oscillation is stopped for more than a predetermined period of time, the center wavelength is sometimes deviated to a large extent from the target wavelength. Accordingly, in such a case, the position of the optical component is previously changed by the pulse motor unit, thereby almost setting the center wavelength at the target wavelength. In addition, the wavelength control is resumed by the piezoelectric element unit fast in response, thus reducing the time that elapses before the center wavelength is set at the target wavelength.

BEST MODE FOR CARRYING OUT THE INVENTION

Preferred embodiments according to the present invention will be explained in detail below with reference to the drawings. In the embodiment below, an excimer laser device is taken as an example of a laser device to make the explanation.

Figure 1:
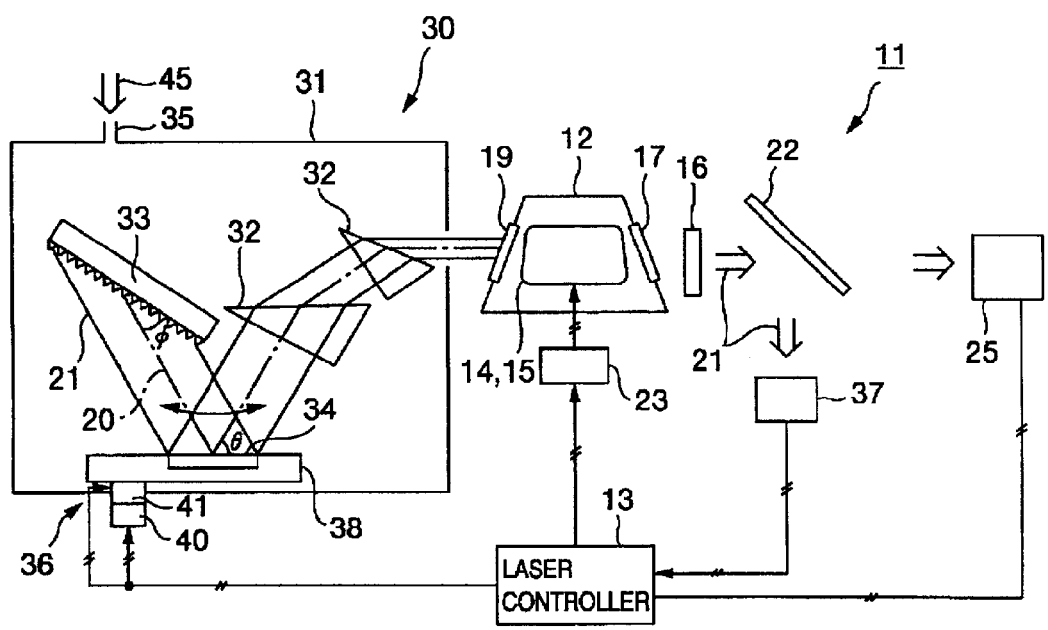
FIG. 1 is an explanatory view of a laser device according to a first embodiment of the present invention.

A first embodiment will be explained. FIG. 1 shows a configuration of an excimer laser device 11 according to a first embodiment. In FIG. 1, the excimer laser device 11 includes a laser chamber 12 containing laser gas being a laser medium. A front window 17 and a rear window 19 for transmitting a laser light 21 are attached at both end portions of the laser chamber 12 by means of holders (not shown). Inside the laser chamber 12, a pair of discharge electrodes 14 and 15 are placed to oppose each other in the vertical direction to the paper surface of FIG. 1. High voltage is applied between the discharge electrodes 14 and 15 from a high voltage power source 23, whereby electric discharge is caused to occur to excite laser gas, thereby generating the laser light 21.

The generated laser light 21 travels, for example, rearward (in the left direction in FIG. 1) to enter a band narrowing unit 30 for narrowing a band of the laser light 21. The band narrowing unit 30 includes prisms 32 and 32, a wavelength selection mirror 34, a grating 33, and the like as optical components. Further, a band narrowing box 31 encloses these optical components. A wall of the band narrowing box 31 is provided with a purge gas supply port 35 for introducing a clean and dry inert gas 45 such as nitrogen into the band narrowing box 31 therethrough.

The laser light 21, which has entered the band narrowing unit 30, is expanded by the prisms 32 and 32, reflected by the wavelength selection mirror 34, and is incident on the grating 33 being the band narrowing optical component. On the grating 33, only the laser light 21 with a predetermined center wavelength λc determined by an angle of incidence of the laser light 21 is reflected by diffraction. In this situation, the wavelength selection mirror 34 is mounted on a movable holder 36 rotatable within the horizontal plane (within a plane parallel with the paper surface of FIG. 1). By changing an angle θ of the wavelength selection mirror 34 relative to a laser optical axis 20, an incident angle φ of the laser light 21 incident on the grating 33 is changed, and the center wavelength λc of the laser light 21 diffracted on the grating 33 is changed.

The laser light 21 the band of which is narrowed in the band narrowing unit 30 is amplified by the electric discharge between the discharge electrodes 14 and 15 while reciprocating several times between the band narrowing unit 30 and a front mirror 16 for partially reflecting the laser light 21. Subsequently, it is transmitted through the front mirror 16 and is radiated toward the front (rightward in FIG. 1) as the laser light 21. Part of the radiated laser light 21 is taken out by a beam splitter 22, and the center wavelength λc thereof is monitored by a wavelength monitor 37.

Figure 2:
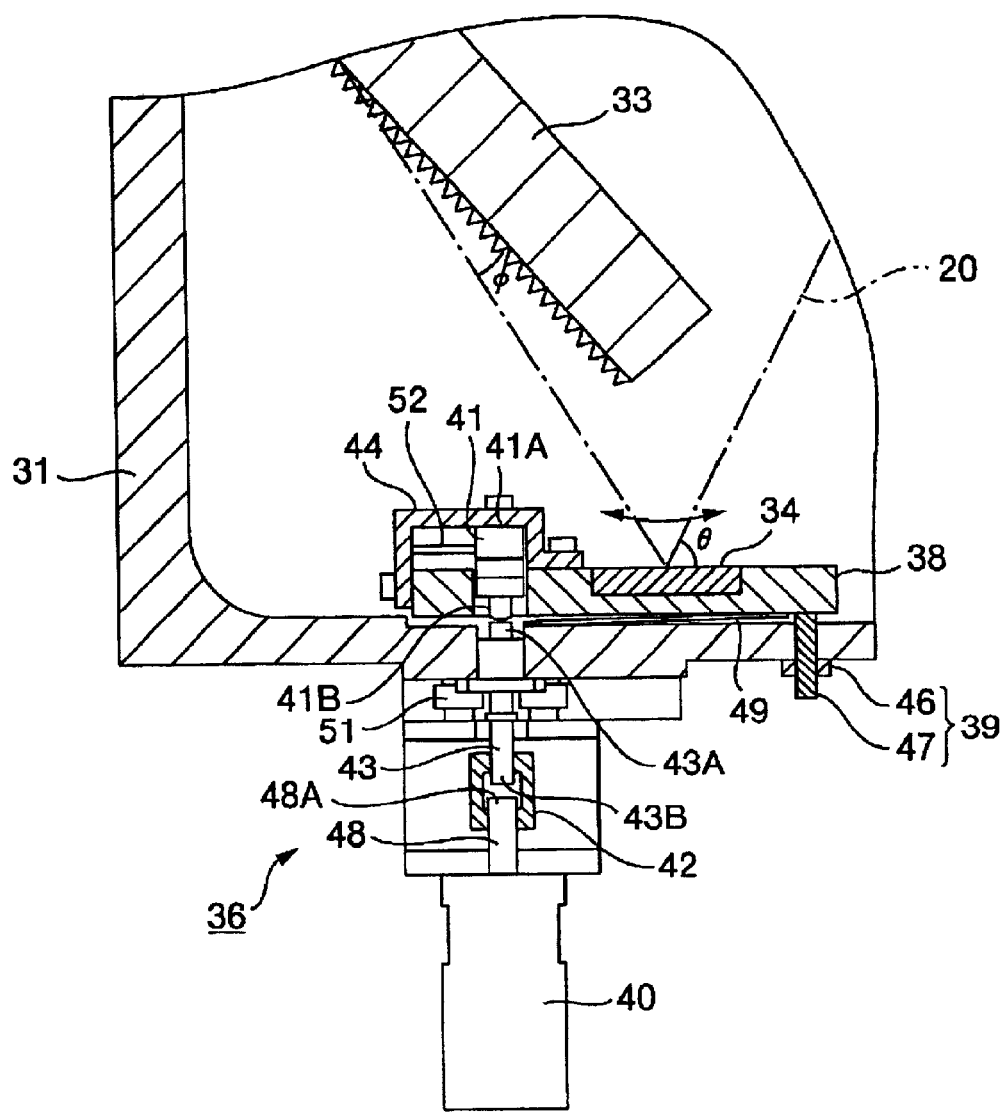
FIG. 2 is a sectional plan view of a movable holder according to the first embodiment.
Figure 3:
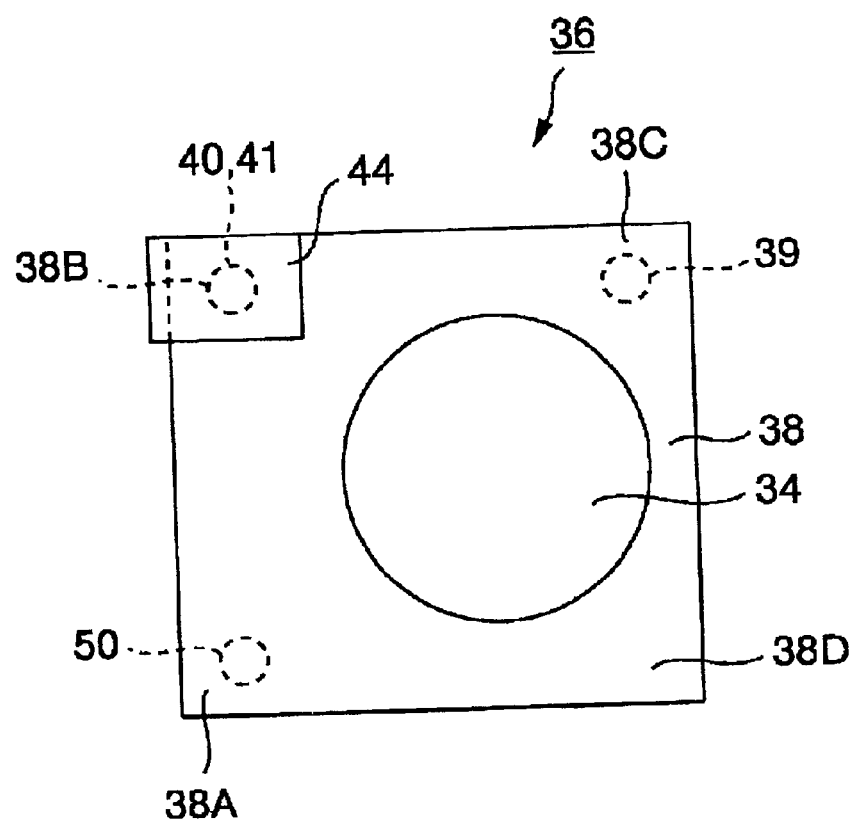
FIG. 3 is a plan view of the movable holder seen from an inside of a band narrowing box in FIG. 2.

The structure of the movable holder 36 according to the first embodiment will be explained in detail. FIG. 2 shows a sectional plan view of the movable holder 36, and FIG. 3 shows a front view of the movable holder 36 seen from an inner side of the band narrowing box 31. As FIG. 2 and FIG. 3 show, the movable holder 36 includes a quadrangular mirror holder 38 to which the wavelength selection mirror 34 is fixed. The mirror holder 38 is pulled to the band narrowing box 31 by the force given by a tension spring (not shown) and a leaf spring 49.

Out of four corner portions 38A to 38D of the miller holder 38, a third corner portion 38C and a first corner portion 38A are pressed from the band narrowing box 31 by a bearing member 39 and a manual micrometer 50, respectively. In the bearing member 39, for example, a screw 47 is protruded from the band narrowing box 31 by a predetermined length and fixed with a nut 46. As for the manual micrometer 50, protruding amount from the band narrowing box 31 is freely changeable manually. A piezoelectric element unit 41 is attached to a second corner portion 38B of the mirror holder 38 as described hereinafter. A tip end portion 41B of the piezoelectric element unit 41 is pressed by a pulse motor unit 40 fixed to the band narrowing box 31 via a ball screw unit 43.

As FIG. 1 shows, the pulse motor unit 40 and the piezoelectric element unit 41 are electrically connected to a laser controller 13. The pulse motor unit 40 rotates a motor shaft 48 (See FIG. 2) a predetermined amount in response to the number of pulses of a pulse signal received from the laser controller 13. A rear end portion 43B with threads being precisely machined of a ball screw unit 43 is attached at a tip end portion 48A of a motor shaft 48 via a coupling 42. The ball screw unit 43 smoothly moves linearly in a fore-and-aft direction while rotated by a guide 51.

A tip end portion 43A of the ball screw unit 43 is precisely machined to be a plane vertical to a longitudinal direction thereof, and the tip end portion 41B of the piezoelectric element unit 41, which is precisely machined to be a spherical surface, abuts to this plane. Accordingly, when the ball screw unit 43 moves in the fore-and-aft direction while rotating, the piezoelectric element unit 41 moves in the fore-and-aft direction without rotating. A rear end portion 41A of the piezoelectric element unit 41 is fixed to an ultraviolet cover 44 fixed to the mirror holder 38. Wiring 52 of the piezoelectric element unit 41 passes inside the ultraviolet cover 44 and reaches an outside of the band narrowing box 31 via an introduction hole (not shown) to be connected to the laser controller 13. The piezoelectric element unit 41 extends in the fore-and-aft direction by the length corresponding to the magnitude of an electric voltage V applied via the wiring 52.

Specifically, the laser controller 13 outputs a signal to the movable holder 36 to extend or contract the pulse motor unit 40 or the piezoelectric element unit 41, thereby pushing or pulling the second corner portion 38B of the mirror holder 38 via the ultraviolet cover 44. Thus, the wavelength selection mirror 34 is rotated, whereby the aforesaid incident angle φ is changed, thus changing the center wavelength λc of the laser light 21.

In this situation, the laser controller 13 performs a wavelength control based on the center wavelength λc monitored by the wavelength monitor 37 so that a wavelength deviation Δλ being a difference between the center wavelength λc and a target center wavelength λc is within a predetermined allowable range. In the following explanation, "to control the wavelength so that the wavelength deviation Δλ is within a predetermined allowable range" is called setting the center wavelength λc to the target wavelength λ0. The laser controller 13 controls the output of the excimer laser device 11 by outputting a command to the high voltage power source 23. Further, the laser controller 13 and a processing machine 25 communicate with each other.

Next, a concrete control procedure that is followed when the laser controller 13 sets the center wavelength λc of the laser light 21 to the predetermined target wavelength λ0 will be explained.

Figure 4:
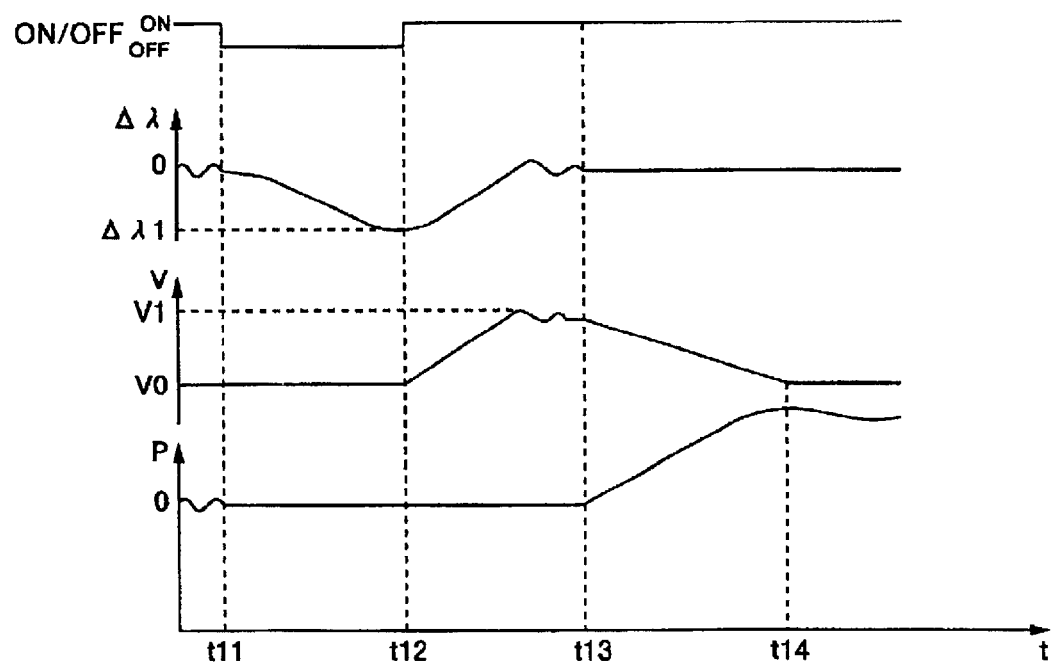
FIG. 4 is a timing chart for explaining a first control procedure according to the first embodiment.

Initially, the case in which laser oscillation is resumed after the laser oscillation is stopped for more than a predetermined period of time (this is called a first control procedure) will be explained. FIG. 4 is a timing chart showing, from the top in order, an oscillation command (ON/OFF) signal from the processing machine 25, the wavelength deviation Δλ representing the difference between the center wavelength λc monitored by the wavelength monitor 37 and the target center wavelength λc, a command voltage V outputted to the piezoelectric element unit 41, and a number of pulses P of a pulse signal outputted to the pulse motor unit 40, respectively.

Until a time t11, the oscillation command signal is ON, and the laser light 21 is oscillated. During this period of time, the laser controller 13 monitors the center wavelength λc of the laser light 21 and outputs the pulse signal to the pulse motor unit 40 to control the center wavelength λc to be the desired target center wavelength λc. As the result, the wavelength deviation Δλ repeats a slight variation in the vicinity of 0. In this situation, the laser controller 13 always applies a neutral voltage V0 of the magnitude of about half the maximum applied voltage VM for extending the piezoelectric element unit 41 at a full stroke to the piezoelectric element unit 41. Thereby the piezoelectric element unit 41 is kept in almost a middle position in the full stroke (hereinafter, called a neutral position).

At the time t11, when a command (OFF) to stop the laser oscillation is outputted to the laser controller 13 from the processing machine 25, the laser controller 13 outputs a stop command to the high voltage power source 23 to stop electric discharge to thereby stop the laser oscillation. Following this, the laser controller 13 stops the pulse signal sent to the pulse monitor unit 40 for the wavelength control.

At a time t12, when a signal (ON) to resume laser oscillation is outputted from the processing machine 25, the laser controller 13 outputs a command to the high voltage power source 23 to apply high voltage between the discharge electrodes 14 and 15 to resume laser oscillation. In this situation, since electric discharge is stopped from the time t11 to the time t12, "a deviation of the center wavelength $\lambda c$ due to temperature reduction", which is explained in the Background Art, occurs. Further, the aforementioned chirping also occurs, and thus the center wavelength $\lambda c$ is deviated from the target wavelength $\lambda 0$ to a large extent. The wavelength deviation $\Delta\lambda$ in this situation is taken as $\Delta\lambda 1$.

The laser controller 13 monitors the center wavelength $\lambda c$ from the wavelength monitor 37 with the resumption of laser oscillation at the time t12. The laser controller 13 then computes the amount of rotation of the wavelength selection mirror 34, which is required to set the center wavelength $\lambda c$ to the target wavelength $\lambda 0$, and based on the computed result, it applies a voltage V1 required to rotate the wavelength selection mirror 34 to a desired angle $\theta$ to the piezoelectric element unit 41. As the result, the piezoelectric element unit 41 extends or contracts to "desired length" (hereinafter, called a wavelength control position) in about a few to a few tens of $\mu$ sec. After the extension or contraction, by finely adjusting the voltage V based on the monitored center wavelength $\lambda c$, the center wavelength $\lambda c$ becomes almost the same as the target wavelength $\lambda 0$, whereby the wavelength deviation $\Delta\lambda$ is within the allowable range.

Thereafter, the laser controller 13 gradually changes the voltage V applied to the piezoelectric element unit 41 to return the voltage from the voltage V1 to the neutral voltage V0 from a time t13 to a time t14. At the same time, the laser controller 13 causes the pulse motor unit 40 to contract or extend by the same contracting or extending amount of the piezoelectric element unit 41 in the reverse direction at almost the same contracting or extending speed, while keeping the wavelength deviation $\Delta\lambda$ within the allowable range. As the result, the piezoelectric element unit 41 returns to the neutral position at the time t14. Thereafter, it controls the wavelength only by means of the pulse motor unit 40 while keeping the piezoelectric element unit 41 in the neutral position.

Specifically, until the time t13, the stroke of the piezoelectric element unit 41 drives the movable holder 36 to determine the angle $\theta$ of the wavelength selection mirror 34. From the time t13 to t14, the strokes of both the piezoelectric element unit 41 and the pulse motor unit 40 drive the movable holder 36, and from the time t14, only the pulse motor unit 40 drives it.

Next, the case in which the target wavelength $\lambda 0$ has to be changed due to a command from, for example, the processing machine 25 (this is called a second control procedure) will be explained. In such a case, the excimer laser device 11 needs to set the center wavelength $\lambda c$ to a new target wavelength $\lambda 0$ in a short time for the same reason as described above.

Figure 5:
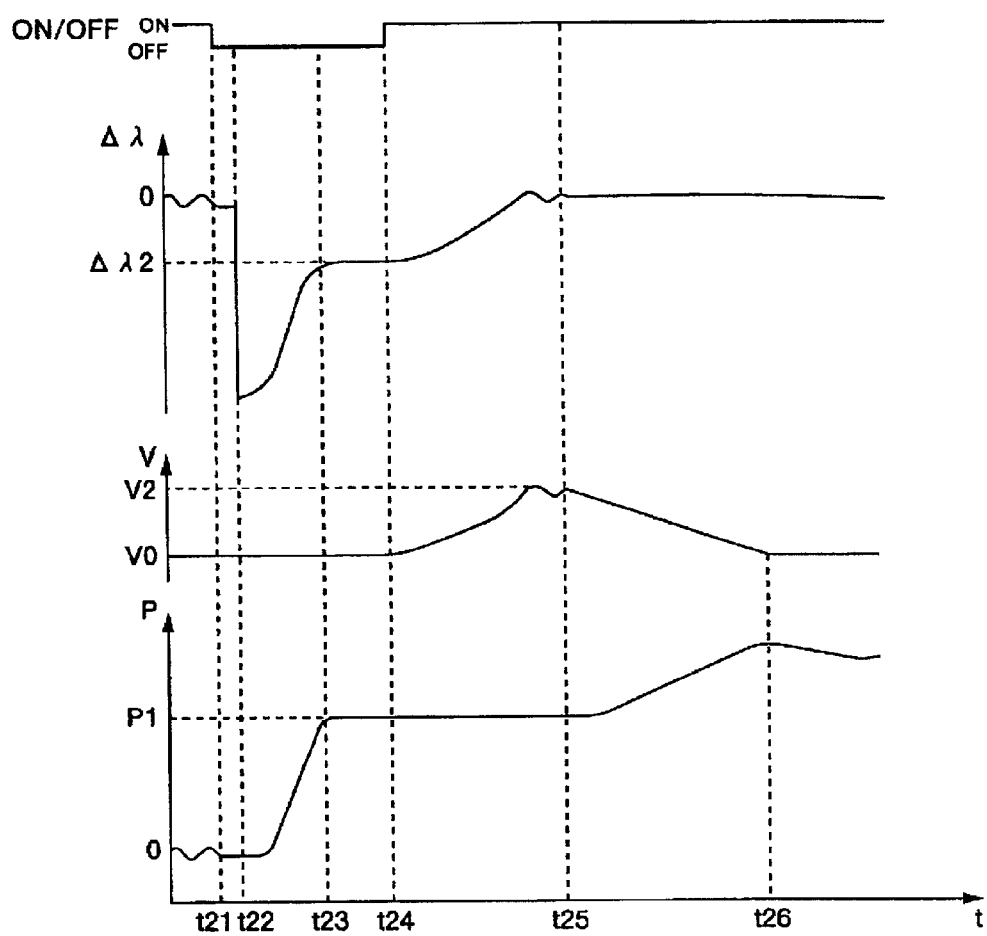
FIG. 5 is a timing chart for explaining a second control procedure according to the first embodiment.

FIG. 5 is a timing chart showing the oscillation command (ON/OFF) signal from the processing machine 25, the wavelength deviation $\Delta\lambda$, the command voltage V outputted to the piezoelectric element unit 41, and the number of pulses P of a pulse signal outputted to the pulse motor unit 40, respectively.

At a time t21, when a command (OFF) to stop the laser oscillation is outputted to the laser controller 13 from the processing machine 25, the laser controller 13 outputs a stop command to the high voltage power source 23 to stop electric discharge to thereby stop the laser oscillation. Following this, the laser controller 13 stops the pulse signal sent to the pulse monitor unit 40 for the wavelength control.

At a time t22, a new target wavelength $\lambda N$ is outputted to the laser controller 13 from the processing machine 25. The laser controller 13 calculates a wavelength difference between the former target wavelength $\lambda 0$ and the new target wavelength $\lambda N$. The laser controller 13 then finds the number of pulses P1 corresponding to the wavelength difference, based on a table storing the relationship between the wavelength difference to be changed and the number of pulses the command for which is issued to the pulse motor unit 40, which is previously set. The pulse signals as many as the above number of pulses P1 are outputted to the pulse motor unit 40. In this manner, the center wavelength $\lambda c$ is previously kept close to the new target wavelength $\lambda N$, whereby the time taken to set the center wavelength $\lambda c$ to the new target wavelength is reduced. This is called predrive, which shall be finished at a time t23.

At a time t24, when a signal (ON) to resume laser oscillation is outputted from the processing machine 25, the laser controller 13 outputs a command to the high voltage power source 23 to apply high voltage between the discharge electrodes 14 and 15 to resume laser oscillation. At the time t24, the center wavelength $\lambda c$ is close to the new target wavelength $\lambda N$ by predrive, but the laser light 21 is not oscillated, and thus it is not known whether or not it is accurately set at the target wavelength $\lambda N$. Further, since electric discharge is stopped from the time t21 to the time t24, the center wavelength $\lambda c$ is deviated from the new target wavelength $\lambda N$ due to temperature reduction inside the laser chamber 12, chirping and the like as described, and the wavelength deviation $\Delta\lambda$ becomes $\Delta\lambda 2$.

Hence, the laser controller 13 monitors the center wavelength $\lambda c$ from the wavelength monitor 37 with the resumption of laser oscillation at the time t24. The laser controller 13 then computes the amount of rotation of the wavelength selection mirror 34 to set the center wavelength $\lambda c$ at the target wavelength $\lambda 0$, and, it applies a voltage V2 required to rotate the wavelength selection mirror 34 to a desired angle $\theta$ to the piezoelectric element unit 41. As the result, the piezoelectric element unit 41 extends or contracts to the wavelength control position in about a few to a few tens of $\mu$sec. After the extension or contraction, by finely adjusting the voltage V based on the monitored center wavelength $\lambda c$, the center wavelength $\lambda c$ becomes almost the same as the new target wavelength $\lambda N$ at a time t25, whereby the wavelength deviation $\Delta\lambda$ is within the allowable range.

The control hereinafter is almost the same as the above first control procedure. The laser controller 13 gradually changes the voltage V applied to the piezoelectric element unit 41 to return the voltage to the neutral voltage V0 from the time t25 to a time t26. At the same time, the laser controller 13 causes the pulse motor unit 40 to extend or contract in the reverse direction to the movement of the piezoelectric element unit 41, while keeping the wavelength deviation $\Delta\lambda$ within the allowable range. Thereafter, the wavelength control is performed by means of the pulse motor unit 40 while the piezoelectric element unit 41 is kept in the neutral position.

In each of the above-described timing charts, the time t does not have equally spaced scales, and the reduction is changed as necessary. For example, the time required from the time t24 to t25 is a few to a few tens of $\mu$sec as explained above, but it is drawn to be magnified in the lateral direction for explanation. Further, the second control procedure as above is applicable to the case in which the target wavelength λ0 is not changed during the intermission of laser oscillation. Specifically, if the laser oscillation is intermitted for more than a predetermined period of time, the center wavelength λc deviates from the target wavelength to a large extent. Accordingly, when the laser oscillation is intermitted, it may be suitable to confirm whether the center wavelength λc becomes longer or shorter and perform predrive in a direction to amend the deviation occurring during the intermission.

According to the first embodiment explained above, the movable holder 36 for rotating the wavelength selection mirror 34 within the horizontal plane includes a first drive mechanism capable of moving by a very short distance and a second drive mechanism capable of moving by a long distance. As the result, when the center wavelength λc is to be finely controlled, it is driven by the first drive mechanism, and when the center wavelength λc is to be moved to a large extent, it is driven by the second drive mechanism, thereby making it possible to perform wavelength control with high precision over a wide range.

The piezoelectric element unit 41 is used as the first drive mechanism, and the pulse motor unit 40 is used as the second drive mechanism. Specifically, the piezoelectric element unit 41 can be extended and contracted in a short time, but the extendable and contractible stoke is short. On the other hand, the pulse motor unit 40 takes time to be extended and contracted, but the stroke is longer. Consequently, by combining them, when the center wavelength λc has to be controlled abruptly, the center wavelength λc is quickly controlled to be close to the target wavelength λ0 by means of the piezoelectric element unit 41 faster in response. When the center wavelength λc is almost set at the target wavelength λ0, the change in the center wavelength λc thereafter is known to become slow with respect to time, and therefore it is also possible to respond to a large change in the center wavelength λc by performing the control by means of the pulse motor unit 40. It becomes possible to set the center wavelength λc at the target wavelength λ0 in a short time, and also respond to a large change in the center wavelength λc.

Further, when the center wavelength λc is expected to be deviated from the target wavelength λ0, the laser controller 13 drives the wavelength selection mirror 34 by means of the piezoelectric element unit 41 at first. The piezoelectric element unit 41 is extended or contracted to desired length in a very short time, that is, about a few μsec after the command voltage V is applied. Accordingly, it is possible to accurately control the wavelength selection mirror 34 at the target angle θ in a short time and obtain the laser light 21 with the desired center wavelength λc. As the result, when the laser light 21 is applied to processing of lithography and the like, the laser light 21 unsuitable for the processing is hardly radiated, thus reducing defective processing. Further, waiting time before the start of the processing is reduced, thus improving availability of the processing machine 25.

Especially as explained in the first embodiment, when the laser oscillation is stopped for more than a predetermined period of time, or the target wavelength λ0 is changed while the laser is oscillated or the laser oscillation is stopped, the wavelength deviation Δλ increases. In this case, according to the present invention, the center wavelength λc can be also set at the target wavelength λ0 in a short time, which is very effective.

After the angle θ of the wavelength selection mirror 34 is controlled by means of the piezoelectric element unit 41, the piezoelectric element unit 41 is returned to the neutral position, and thereafter the angle θ of the wavelength selection mirror 34 is controlled by the pulse motor unit 40. The piezoelectric element unit 41 sometimes varies in its length when a fixed voltage continues to be applied thereto or an ambient temperature thereof changes. Accordingly, the pulse motor unit 40 without such variations drives the wavelength selection mirror 34, thereby making it possible to accurately perform the wavelength control over a long period of time.

It is known that the piezoelectric element unit 41 is easily deteriorated when a large voltage V continues to be applied thereto. Accordingly, by making the pulse motor unit 40 perform the control from the time t14 and a time t26, only the neutral voltage V0 of the magnitude as much as about a half of the maximum applied voltage VM is applied to the piezoelectric element unit 41 to thereby prevent deterioration of the piezoelectric element unit 41.

Further, the piezoelectric element unit 41 is attached at a tip end portion A of the pulse motor unit 40. Accordingly, when returning the piezoelectric element unit 41 to the neutral position, it is possible to accurately compensate the extending or contracting amount of the piezoelectric element unit 41 by extending or contracting the pulse motor unit 40 in the opposite direction at the same speed as the extension or contraction of the piezoelectric element unit 41. Specifically, since one degree of freedom of control is provided for the angle θ of the wavelength selection mirror 34, control to compensate the extending or contracting amount is facilitated, and thus it hardly happens that the control fails to move the wavelength selection mirror 34 out of the angle θ.

The ultraviolet cover 44 prevents the piezoelectric element unit 41 from being exposed to the laser light 21 and its reflected light. It is known that the piezoelectric element unit 41 is deteriorated by being radiated with ultraviolet rays. Since the excimer laser device 11 has the laser light 21 being ultraviolet light, the ultraviolet cover 44 prevents the radiation with the ultraviolet rays, thereby preventing piezoelectric element unit 41 from being deteriorated.

Since the inert gas 45 is introduced into the band narrowing box 31 to fill the surroundings of the piezoelectric element unit 41 with the inert gas 45, the piezoelectric element unit 41 is always in the dry atmosphere. It is known that the piezoelectric element unit 41 is not resistant to humidity and is deteriorated in highly humid environments, and thus the life of the piezoelectric element unit 41 can be increased by reducing the ambient humidity.

When the laser oscillation is stopped for more than a predetermined period of time, or the target wavelength λ0 is changed, the deviation amount of the center wavelength λc of the laser light 21 is previously predicted, and based thereon, the angle of the wavelength selection mirror 34 is almost adjusted by the pulse motor unit 40. As the result, the wavelength control can be resumed from the position in which the center wavelength λc is close to the target wavelength λ0, thus reducing the time taken for the center wavelength λc to be set at the target wavelength λ0. Since the pulse motor unit 40 with a large stroke drives the movable holder 36, it is possible to respond to the situation in which the center wavelength λc is deviated to a large extent.

In the above-described embodiment, the wavelength control performed when the wavelength deviation Δλ is large as the result that the laser oscillation is stopped or the target wavelength λ0 is changed is explained, but this is not restrictive. For example, before the times t11 and t21 and after the times t14 and t26, when changing the angle θ of the wavelength selection mirror 34, it may be suitable to always drive the piezoelectric element unit 41 to perform the wavelength control. In such a case, when the stroke of the piezoelectric element unit 41 exceeds predetermined length, or when the voltage V applied to the piezoelectric element unit 41 exceeds a predetermined value, the wavelength control is switched to that with the pulse motor unit 40. Alternatively, as in the aforementioned first and second control procedure, the stroke of the piezoelectric element unit 41 may be compensated by the pulse motor unit 40, and after the piezoelectric element unit 41 returns to the neutral position, the wavelength control may be performed by means of the piezoelectric element unit 41 again.

Specifically, in the wavelength control in the case of constant laser oscillation, the wavelength control can be also performed in a short time by changing the angle θ of the wavelength selection mirror 34 by means of the piezoelectric element unit 41. Accordingly, it hardly happens that the wavelength control is not performed in time and the wavelength deviation Δλ becomes larger than the allowable value, thus making it possible to improve availability of the processing machine 25. In addition, the piezoelectric element unit 41 is capable of accurately extending and contracting by an extremely short distance with higher resolution as compared with the pulse motor unit 40, and thus the incident angle φ can be accurately controlled to further reduce the wavelength deviation Δλ.

Figure 6:
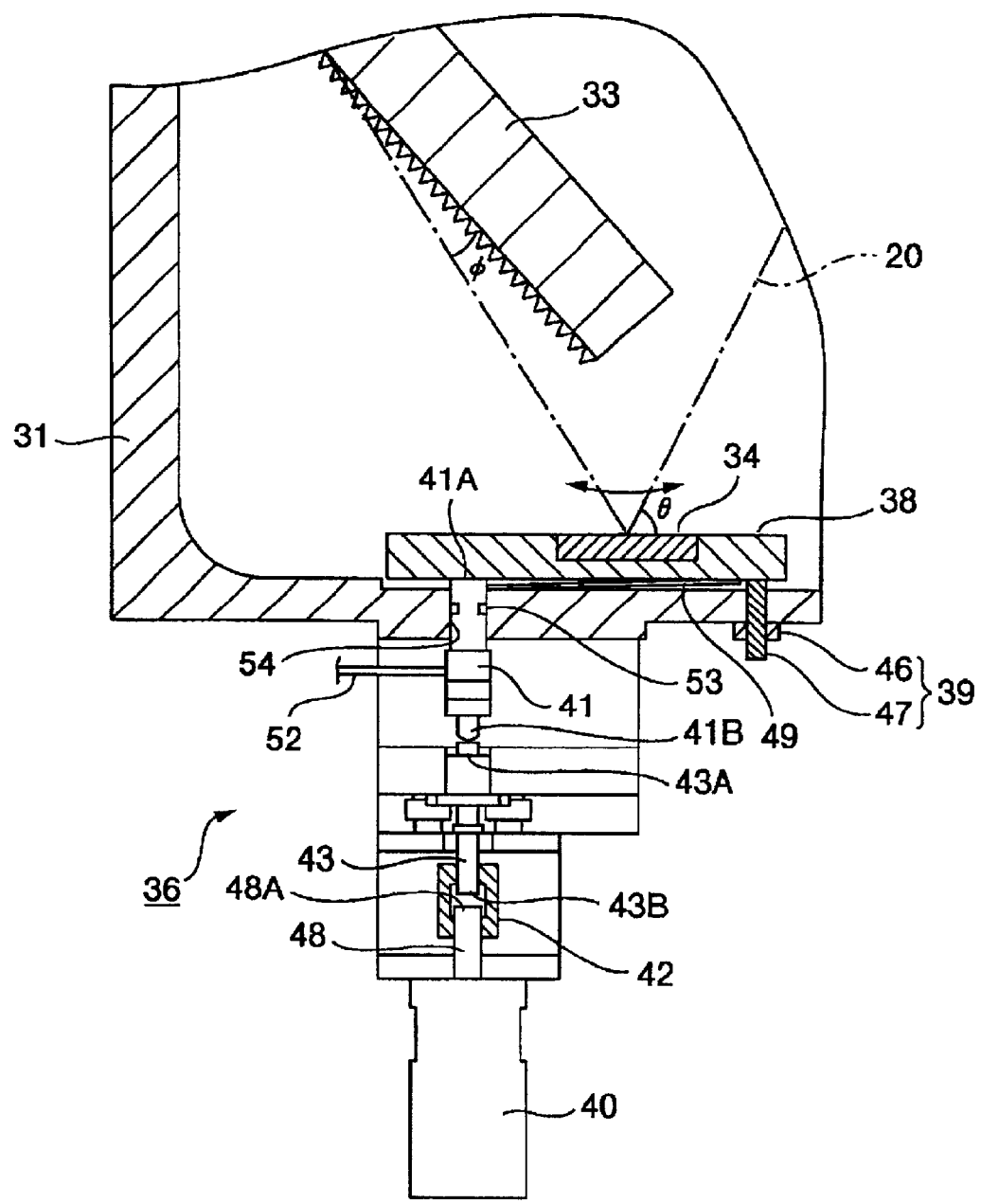
FIG. 6 is a sectional plan view of a movable holder according to a second embodiment of the present invention.

Next, a second embodiment will be explained. FIG. 6 shows a sectional plan view of the movable holder 36 according to the second embodiment. In FIG. 6, the pulse motor unit 40 and the piezoelectric element unit 41 attached at the tip end thereof are both attached to an outer portion of the band narrowing box 31. The rear end portion 41A of the piezoelectric element unit 41 passes through an opening 54 provided in the band narrowing box 31 and presses the second corner portion 38B (See FIG. 3) of the mirror holder 38. An O-ring 53 seals a space between the piezoelectric element unit 41 and the opening 54.

As explained above, according to the second embodiment, the piezoelectric element unit 41 and the motor are provided at the outer portion of the band narrowing box 31. Consequently, it never happens that the piezoelectric element unit 41 is exposed to the ultraviolet laser light 21 and deteriorated, and it is not necessary to provide the ultraviolet cover 44. Further, the wiring 52 is not exposed to ultraviolet rays, and thus it never happens that impurity gas generates from an insulating material and the like with which the wiring 52 is covered and contaminates to damage the optical components.

Figure 7:
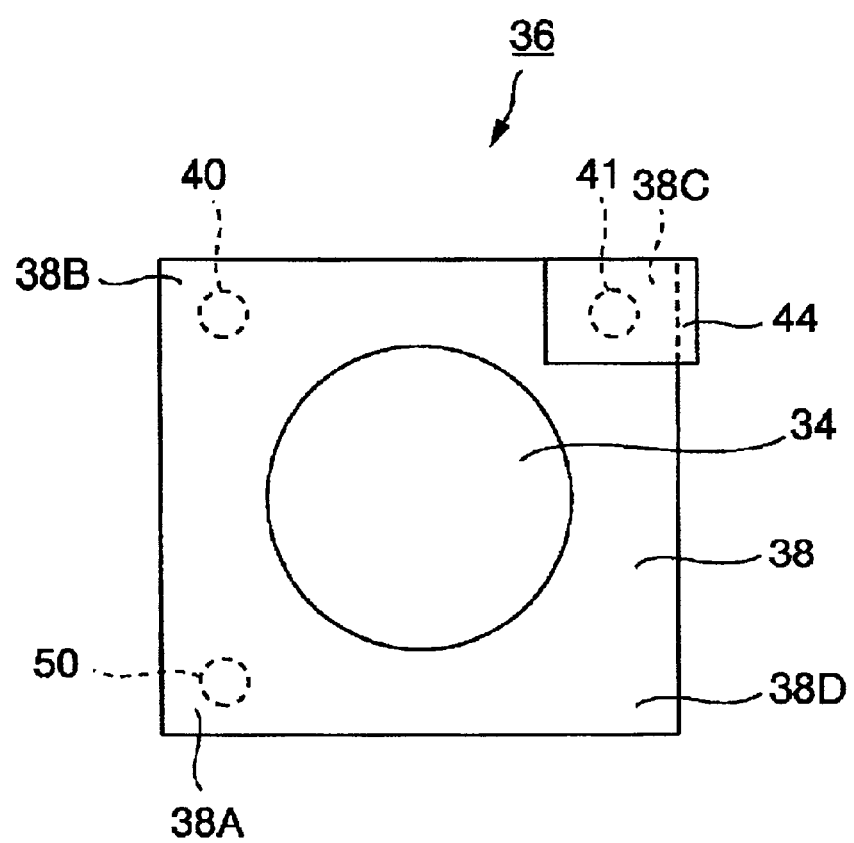
FIG. 7 is a plan view of a movable holder according to a third embodiment of the present invention, seen from the inside of the band narrowing box.

Next, a third embodiment will be explained. FIG. 7 shows a front view of the movable holder 36 according to the third embodiment seen from the inside of the band narrowing box 31. As FIG. 7 shows, out of the four corner portions 38A to 38D of the quadrilateral mirror holder 38, the first corner portion 38A is pressed from the band narrowing box 31 by the manual micrometer 50 fixed to the band narrowing box 31. The pulse motor unit 40 and the piezoelectric element unit 41 are attached to the second corner portion 38B and the third corner portion 38C. The mirror holder 38 is pulled to the band narrowing box 31 by the force given by the tension spring (not shown) and the leaf spring 49 as in FIG. 2.

Specifically, as the result that the pulse motor unit 40 and the piezoelectric element unit 41 are provided at the different corner portions 38B and 38C, the configuration of the movable holder 36 becomes simpler than when the pulse motor unit 40 and the piezoelectric element unit 41 are arranged in line. At the same time, it becomes possible to place the piezoelectric element unit 41 at the outer portion of the band narrowing box 31, and therefore it hardly happens that the piezoelectric element unit 41 is radiated with ultraviolet rays, thus making it possible to prevent it from being deteriorated.

In the second and third embodiment, the procedure to control the center wavelength λc to be the target wavelength λ0 in a short time is also the same as the above-described first and second control procedure. However, in the time t13 to t14, and the time t25 to t26, when returning the piezoelectric element unit 41 to the neutral position, it is necessary to output a pulse signal to the pulse motor unit 40 so that the inclination of the wavelength selection mirror 34 is not changed.

Figure 8:
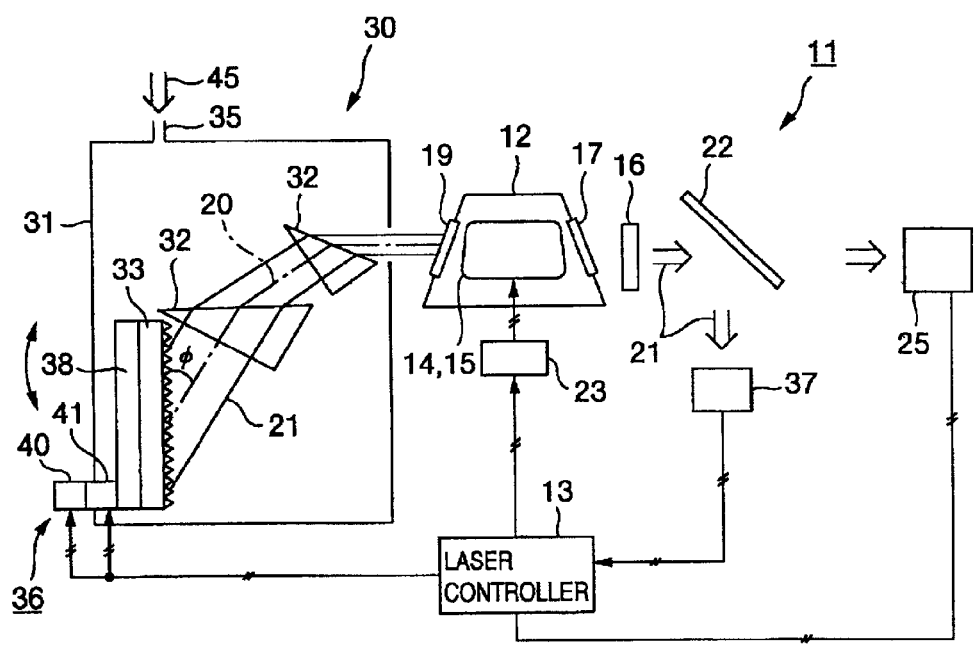
FIG. 8 is an explanatory view of a modification example of the laser device according to the first embodiment of the present invention.
Figure 9:
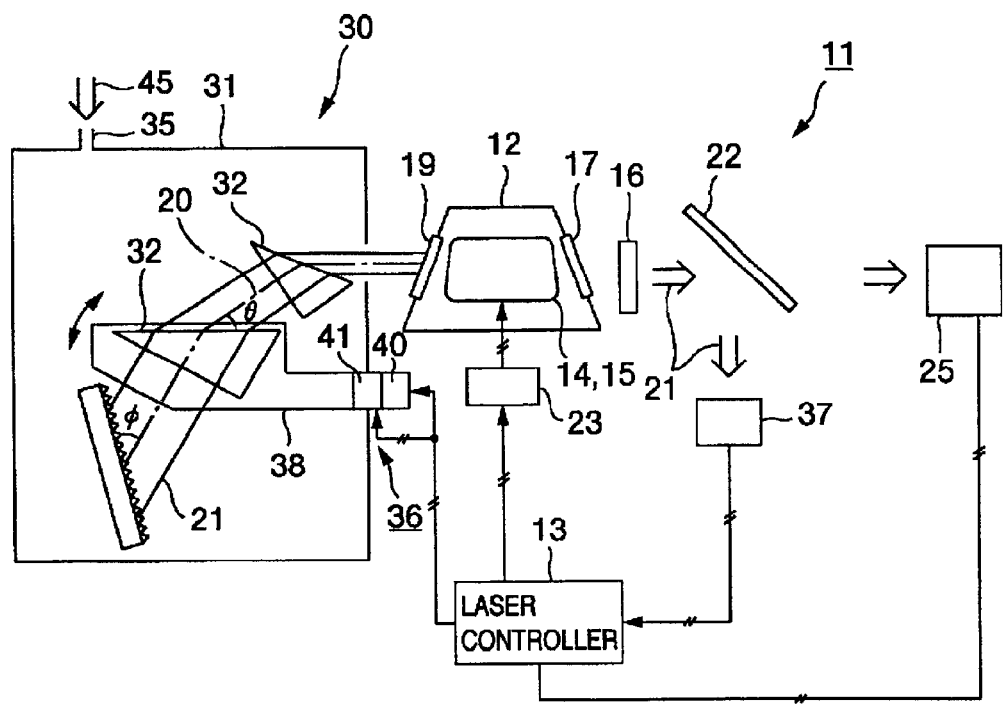
FIG. 9 is an explanatory view of a modification example of the laser device according to the first embodiment of the present invention.
Figure 10:
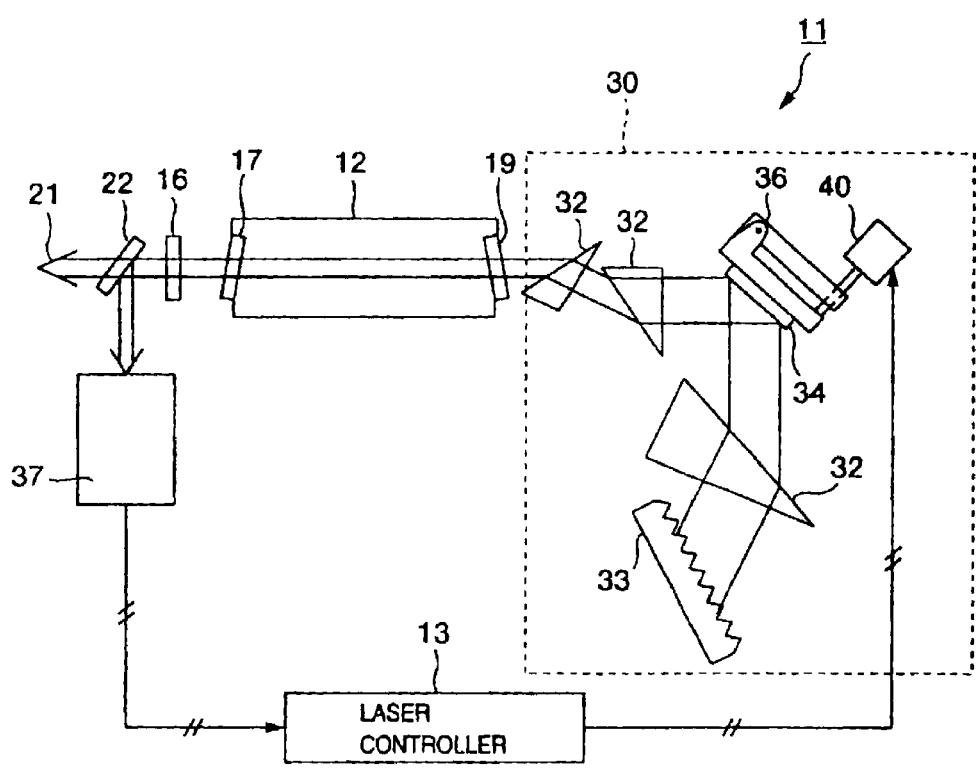
FIG. 10 is an explanatory view of a laser device according to a prior art.

Each of the above embodiments explains that the wavelength selection mirror 34 is mounted on the movable holder 36, which is driven to change the incident angle φ, thereby controlling the center wavelength λc, but this is not restrictive. For example, as FIG. 8 shows, it may be suitable to mount the grating 33 on the movable holder 36, instead of providing the wavelength selection mirror 34, and directly change the incident angle φ relative to the laser light axis 20. Alternatively, as FIG. 9 shows, it may be suitable to mount the prism 32 on the movable holder 36 and thereby change the incident angle φ.

As described above, with the configuration without providing the wavelength selection mirror 34, the optical path of the laser light 21 inside the band narrowing unit 30 is shortened, and the diffraction loss of the laser light 21 is reduced, thereby increasing the output. Accordingly, for example, when applied to an ArF excimer laser device with a small gain, it is more effective. Further, as a band narrowing optical component for narrowing the band of the wavelength to determine the center wavelength λc, the grating 33 is taken as an example to make the explanation, but this is not restrictive, and for example, etalon is also applicable.

In each of the above embodiments, the excimer laser device 11 is cited as an example to make the explanation, it is also effective if it is applied to a fluorine laser device. Specifically, the invention is applicable to all the laser devices in which the center wavelength λc of the laser light 21 is controlled. Further, the piezoelectric element unit 41 is not limited to the piezoelectric element, but it may be anything that changes in length in a short time by applying voltage, electric current, magnetism or the like, and for example, an electrostrictive element, a magnetostrictor and the like may be used.

Japanese Patent Application Laid-open No. 5-283785 explained in the Background Art discloses the embodiment in which the wavelength selection mirror 34 is mounted on the mirror holder 38 including the gimbal mechanism. According to the description, a piezoelectric element may be attached at the tip end of the manual knob for adjusting the angle θ of the wavelength selection mirror 34. However, this is for automatically controlling the angle of the wavelength selection mirror 34 with use of only the piezoelectric element after almost setting the knob manually, and is totally different from the structure of the present invention.

What is claimed is:

1. A wavelength control device for a laser device, comprising:

a movable holder, including a piezoelectric element unit and a pulse motor unit, for moving an optical component with respect to a laser optical axis to change an incident angle of laser light on a band narrowing optical component; and a laser controller for controlling driving of the piezoelectric element unit to move the optical component to set a center wavelength of the laser light at a target wavelength, and controlling subsequent driving of the piezoelectric element unit or the pulse motor unit to maintain the center wavelength at the target wavelength.

2. A wavelength control device for a laser device, comprising:

a movable holder, including a piezoelectric element unit and a pulse motor unit, for moving an optical component with respect to a laser optical axis to change an incident angle of laser light on a band narrowing optical component; and a laser controller for controlling driving of the piezoelectric element unit to move the optical component to set a center wavelength of the laser light at a target wavelength, and controlling subsequent driving of the piezoelectric element unit to return to a neutral position, wherein during the return of the piezoelectric element unit to the neutral position, the laser controller further controls driving of the pulse motor unit to compensate for a positional change of the optical component caused by the return of the piezoelectric element unit to the neutral position to maintain the center wavelength at the target wavelength.

3. A wavelength control device for a laser device, comprising:

a movable holder, including a piezoelectric element unit and a pulse motor unit, for moving an optical component with respect to a laser optical axis to change an incident angle of laser light on a band narrowing optical component; and a laser controller for controlling, during oscillation stoppage of the laser light, driving of the pulse motor unit to move the optical component to a position that would set a center wavelength of the laser light close to a target wavelength, and after oscillation of the laser light resumes, controlling subsequent driving of the piezoelectric element unit to set the center wavelength of the laser light at the target wavelength.

4. A wavelength control device for a laser device, comprising:

a movable holder, including a piezoelectric element unit and a pulse motor unit, for moving an optical component with respect to a laser optical axis to change an incident angle of laser light on a band narrowing optical component; and a laser controller for controlling during oscillation stoppage of the laser light, driving of the pulse motor unit to move the optical component to a position that would set a center wavelength of the laser light close to a target wavelength, and after oscillation of the laser light resumes, controlling subsequent driving of the piezoelectric element unit to set the center wavelength of the laser light at the target wavelength and then to return to a neutral position, wherein during the return of the piezoelectric element unit to the neutral position, the laser controller further controls driving of the pulse motor unit to compensate for a positional change of the optical component caused by the return of the piezoelectric element unit to the neutral position to maintain the center wavelength at the target wavelength.

5. A wavelength control method for a laser device, for controlling so that an oscillation center wavelength of the laser device becomes a target center wavelength, based on a center wavelength detected by a wavelength monitor, the method comprising:

first driving a piezoelectric element unit to set the oscillation center wavelength to the target center wavelength; and subsequently driving either the piezoelectric element unit or a pulse motor unit to maintain the oscillation center wavelength at the target center wavelength.

6. A wavelength control device for a laser device, used for realizing the method as claimed in claim 5, comprising:

a movable holder, including a piezoelectric element unit and a pulse motor unit, capable of moving an optical component with respect to a laser optical axis to change an incident angle of laser light on a band narrowing optical component; and a laser controller which controls driving of the piezoelectric element unit to move the optical component to set a center wavelength of the laser light at a target wavelength, and which controls subsequent driving of the piezoelectric element unit or the pulse motor unit to maintain the center wavelength at the target wavelength.

7. A wavelength control method for a laser device, for controlling so that an oscillation center wavelength of the laser device becomes a target center wavelength, based on a center wavelength detected by a wavelength monitor, the method comprising:

first driving a piezoelectric element unit to set the oscillation center wavelength to the target center wavelength; and subsequently returning the piezoelectric element unit to a neutral position and, at the same time, compensating for a positional change of an optical component caused by the return of the piezoelectric element unit to the neutral position to maintain the oscillation center wavelength at the target center wavelength.

8. A wavelength control device for a laser device; used for realizing the method as claimed in claim 7, comprising:

a movable holder, including a piezoelectric element unit and a pulse motor unit, capable of moving an optical component with respect to a laser optical axis to change an incident angle of laser light on a band narrowing optical component; and a laser controller which controls driving of the piezoelectric element unit to move the optical component to set a center wavelength of the laser light at a target wavelength and controls subsequent driving of the piezoelectric element unit to return to a neutral position, wherein during the return of the piezoelectric element unit to the neutral position, the laser controller further controls driving of the pulse motor unit to compensate for a positional change of the optical component caused by the return of the piezoelectric element unit to the neutral position to maintain the center wavelength at the target wavelength.

9. A wavelength control method for a laser device, for controlling so that an oscillation center wavelength of the laser device becomes a target center wavelength, based on a center wavelength detected by a wavelength monitor, the method comprising:

during oscillation stoppage, driving in advance a pulse motor unit to move an optical component to a position roughly corresponding to the target center wavelength based on a target wavelength after re-oscillation; and after re-oscillation, driving a piezoelectric element unit to set the oscillation center wavelength to the target center wavelength based on the detection result of the wavelength monitor.

10. A wavelength control device for a laser device, used for realizing the method as claimed in claim 9, comprising:

a movable holder, including a piezoelectric element unit and a pulse motor unit, capable of moving an optical component with respect to a laser optical axis to change an incident angle of laser light on a band narrowing optical component; and a laser controller which controls during oscillation stoppage of the laser light, driving of the pulse motor unit to move the optical component to a position that would set a center wavelength of the laser light close to a target wavelength, and after oscillation of the laser light resumes, controls subsequent driving of the piezoelectric element unit to set the center wavelength of the laser light at the target wavelength.

11. A wavelength control method for a laser device, for controlling so that an oscillation center wavelength of the laser device becomes a target center wavelength, based on a center wavelength detected by a wavelength monitor, the method comprising:

during oscillation stoppage, driving in advance a pulse motor unit to move an optical component to a position roughly corresponding to the target center wavelength based on a target wavelength after re-oscillation;

after re-oscillation, first driving a piezoelectric element unit to set the oscillation center wavelength to the target center wavelength based on the detection result of the wavelength monitor; and subsequently returning the piezoelectric element unit to a neutral position and, at the same time, compensating for a positional change of the optical component caused by the return of the piezoelectric element unit to the neutral position to maintain the oscillation center wavelength at the target center wavelength.

12. A wavelength control device for a laser device, used for realizing the method as claimed in claim 9, comprising:

a movable holder, including a piezoelectric element unit and a pulse motor unit, capable of moving an optical component with respect to a laser optical axis to change an incident angle of laser light on a band narrowing optical component; and a laser controller which controls during oscillation stoppage of the laser light, driving of the pulse motor unit to move the optical component to a position that would set a center wavelength of the laser light close to a target wavelength, and after oscillation of the laser light resumes, controls subsequent driving of the piezoelectric element unit to set the center wavelength of the laser light at the target wavelength and then to a neutral position, wherein during the return of the piezoelectric element unit to the neutral position, the laser controller further controls driving of the pulse motor unit to compensate for a positional change of the optical component caused by the return of the piezoelectric element unit to the neutral position to maintain the center wavelength at the target wavelength.

* * * * *